United States Patent [19]

Klockenbrink

[11] 4,357,619
[45] Nov. 2, 1982

[54] HIGH-SPEED NON-IMPACT BAND PRINTER EMPLOYING AN ARRAY OF RADIATION SOURCES FOR PRINTING ON A MOVABLE SURFACE

[76] Inventor: Joseph M. Klockenbrink, 23 Van Wyck La., Lloyd Harbor, N.Y. 11743

[21] Appl. No.: 150,318

[22] Filed: May 16, 1980

[51] Int. Cl.³ ............................................. G06K 15/02
[52] U.S. Cl. .................................. 346/160; 346/108; 355/71; 358/302
[58] Field of Search ...................... 346/108, 153.1, 160; 358/199, 203, 285, 296, 302; 350/274, 275; 101/DIG. 13; 355/67, 71, 3 R, 14 E, 1

[56] References Cited

U.S. PATENT DOCUMENTS

| | | | |
|---|---|---|---|
| 1,980,406 | 11/1934 | Holzer, Sr. | 358/203 |
| 3,592,963 | 7/1971 | Young | 358/293 |
| 3,656,175 | 4/1972 | Carlson et al. | 346/108 X |
| 3,834,803 | 9/1974 | Tsukada | 355/1 |
| 3,967,894 | 7/1976 | Tsilibes | 355/67 |
| 4,040,095 | 8/1977 | Abrams | 358/285 |
| 4,064,513 | 12/1977 | Skala | 346/75 |
| 4,117,518 | 9/1978 | Skala | 358/203 X |
| 4,118,123 | 10/1978 | Spence-Bate et al. | 355/1 X |
| 4,126,388 | 11/1978 | Kawai | 355/67 X |
| 4,251,825 | 2/1981 | Mikami et al. | 346/160 |

*Primary Examiner*—Stuart N. Hecker
*Attorney, Agent, or Firm*—Weinstein & Sutton

[57] ABSTRACT

A high speed non-impact printer including an array of selectively operable light sources. A closed looped band moving across said array at a high linear rate of speed is provided with a plurality of small openings, each associated with one of the light sources. Said sources are selectively energized in a predetermined manner to collectively produce a row of dots and/or lines of varying length which, together with successive rows of dots, cooperate to produce a graphic pattern or a row or rows of characters of the dot matrix type, for example. The design of the system, together with the use of the light sources, totally eliminates the need for a complex optical system, employed in conventional high speed non-impact printers.

22 Claims, 11 Drawing Figures

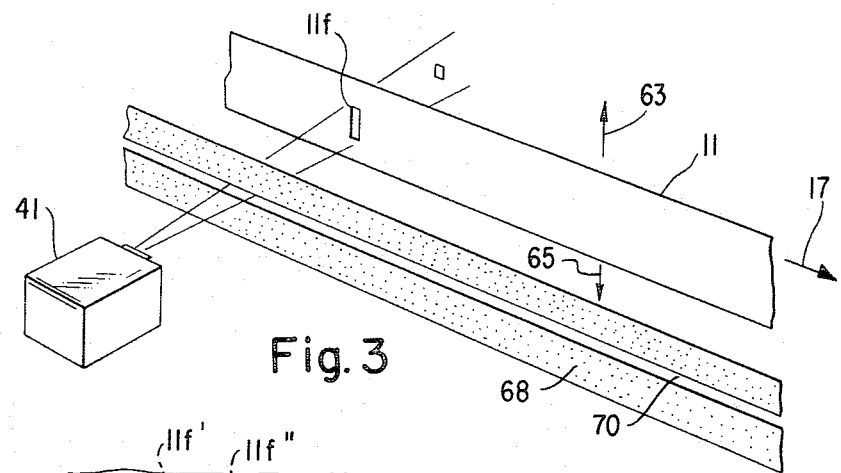
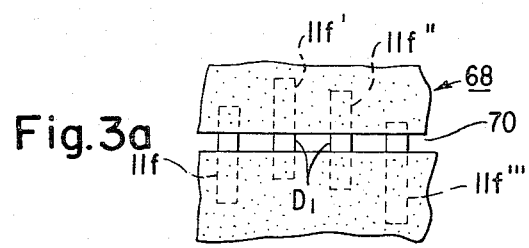
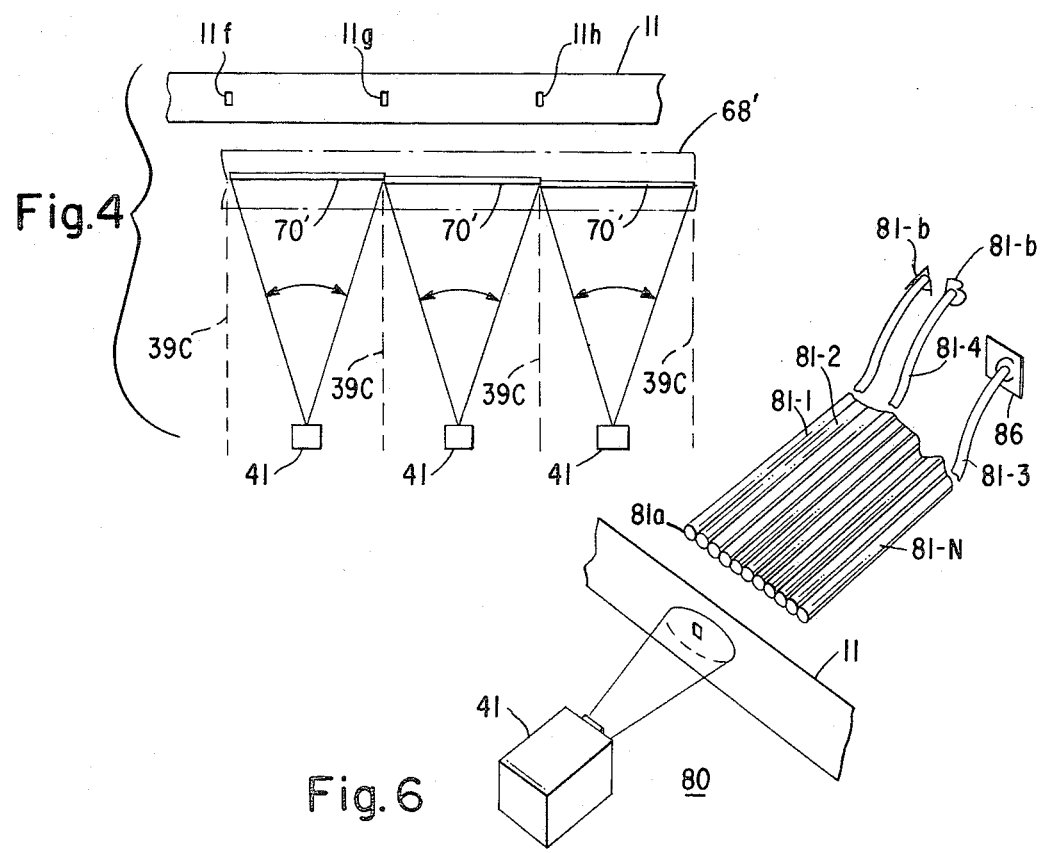

HIGH-SPEED NON-IMPACT BAND PRINTER EMPLOYING AN ARRAY OF RADIATION SOURCES FOR PRINTING ON A MOVABLE SURFACE

BACKGROUND OF THE INVENTION

The present invention relates to non-impact printers and more particularly to high speed non-impact printers using light sources which totally eliminate the need for complex optical devices presently used in non-impact printers having comparable operating speeds.

It is well recognized that printers of the non-impact type are the most logical choice for printer applications in which high printing speed and high quality, high resolution hard copy are primary considerations. The preferred choice of non-impact printer and that representing the state of the art, is the laser-based printer in which a laser source is utilized to generate a beam of laser light which is directed toward a rotating member of polygonal cross-sectional shape and having a plurality of planar reflective facets which reflect the laser beam and cause it to sweep across a scanned surface. In order to print at high speeds, the rotatable member is driven at a very high rpm. A precision optical system positioned at predetermined locations between the laser beam source and the scanned surface focusses the beam to a substantially fine point and further serves to minimize errors introduced due to the physical limitations of design and manufacturing tolerances exhibited by the rotating components. In order to provide printing of good contrast, high resolution and precise registration, it is necessary to produce system components of extremely tight tolerances necessitating significant expenditure in design, manufacture and assembly.

It is an object of the present invention to provide a high speed non-impact printing system which achieves and even surpasses the printing speeds, print quality and registration quality of state of the art non-impact printers through the use of a system whose design lends significant simplification thereto and as one example totally eliminates the precision optical focussing system required in state of the art devices thus leading to an overall significant reduction in cost and complexity of the design, manufacture and assembly stages utilized in producing the system of the present invention.

BRIEF DESCRIPTION OF THE INVENTION

The printer of the present invention is characterized by comprising a novel high speed non-impact printer design utilizing an array of radiation sources each preferably adapted to generate a cone-shaped beam of light. A belt which is positioned to intercept light from all of said sources is linearly driven at a high velocity past said sources. Each radiation source emits a beam having a substantially horn-shaped three-dimensional configuration, the totality of said beams, when simultaneously energized, being adapted to illuminate a narrow elongated rectangular shaped area whose long dimension is at least equal to the width of the scanned surface and whose short dimension is greater than the diameter of a dot formed on the scanned surface by the focussed beam.

The band is preferably a closed-loop band having a plurality of small diameter openings arranged at spaced intervals along said band, each being associated with one of said radiation sources. Control means are provided for selectively energizing one or more of said radiation sources as the associated openings move across the area illuminated by its cone radiation source. Thus, in the time it takes one opening to tranverse the region illuminated by its associated radiation source, an entire dot row of graphic data is produced. The system can be utilized to print characters of the dot matrix type such that the printing of each dot row constitutes one "slice" of a line of dot matrix characters. For example, in printing five column by seven row (5×7) dot matrix characters, each of the aforesaid "slices" constitutes one dot row of an entire line of characters, seven such dot rows collectively forming a line of dot matrix characters. The beam generating devices and electronic control employed for selective illumination of the individual beam generating devices are easily adaptable for providing high speed switching during time intervals of the order of nanoseconds, enabling the closed-loop belt to be driven at ultra-high linear speeds, resulting in faster overall printing speed.

The use of coherent light sources in the system of the present invention provides extremely sharp dots of high resolution and further eliminates the need for optical focussing means which is an expensive, integral part of state of the art high speed non-impact printing systems.

The beam of light generated by the radiation sources may be utilized to irradiate a sensitized emulsion provided upon the scanned surface, which may, for example, be an elongated web. Alternatively, the printer may be employed as an integral part of a printer of the xerographic type in which a selenium drum surface initially having a uniform charge distributed thereon, is exposed to the light beam which alters the charge pattern. A toner is then deposited upon the surface of the selenium drum. The amount of toner adhering to the selenium surface is a function of the latent image formed thereon in accordance with the pattern of electrical charge. The toner deposited upon the latent image is thereafter transferred to a paper web, thereby creating a hard copy of the graphic and/or character information.

The unique arrangement of the printer components, coupled with the employment of coherent light radiation sources totally eliminates the need for expensive, precision optical focussing means without suffering any reduction in print quality, resolution and registration.

OBJECTS OF THE INVENTION AND BRIEF DESCRIPTION OF THE FIGURES

It is, therefore, one object of the present invention to provide a novel high speed non-impact printer employing a closed-loop band.

Still another object of the present invention is to provide a novel high speed non-impact printer employing a large plurality of selectively energizeable high-speed light beam generating means.

Still another object of the present invention is to provide a novel high speed non-impact printer utilizing a plurality of radiation generating sources capable of being switched at nanosecond speeds to thereby significantly enhance the overall printing speed of the printer.

Still another object of the present invention is to provide a novel high speed non-impact printer employing radiation generating devices capable of high speed switching in cooperation with a closed-loop band driven at a high linear velocity for printing dot rows of graphic and/or alphabetic information at extremely high printing speeds.

The above as well as other objects of the present invention will become apparent when reading the accompanying description and drawings in which:

FIG. 3 shows a perspective view of an alternative embodiment of the present invention in which a mask is employed to prevent undesirable transverse perturbations of the band from printing data at positions otherwise displaced from the desired printing positions.

FIG. 3a shows examples of possible alignments which may occur due to perturbations in the movement of band 11 of FIG. 3 either in the upward or downward direction.

FIG. 4 shows a top plan view of still another embodiment of the present invention in which the mask of FIG. 3 is arranged to compensate for undesirable displacement of printed matter due to the simultaneous movement of the scanned surface in a direction transverse to the direction of said moving band;

FIG. 6 shows a perspective view of another alternative embodiment of the present invention employing fiber optic bundles for character generation.

DETAILED DESCRIPTION OF THE INVENTION AND THE PREFERRED EMBODIMENTS THEREOF

Figure 1A:
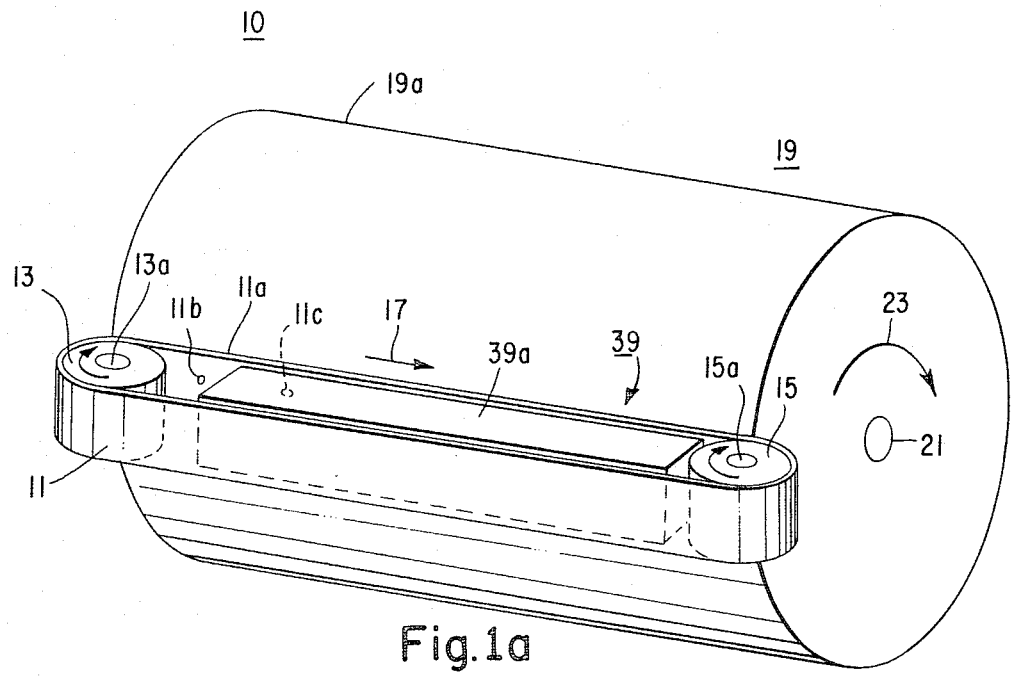
FIG. 1a shows a perspective view of the closed-loop belt and rotatable scanned surface elements employed in the printer of the present invention.
Figure 1B:
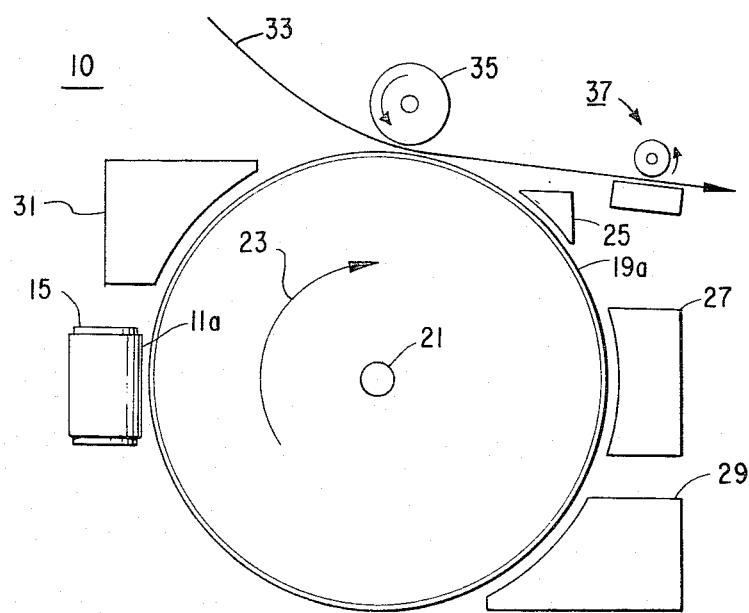
FIG. 1b shows an end view of the printer of the present invention in simplified block diagram form which is useful in explaining the manner in which the present invention may be used within a printing system of the xerographic type.

FIGS. 1a and 1b show, in simplified form, a system embodying the principles of the present invention and comprised of an elongated closed-loop band 11 which may for example be formed of a suitable thin gauge flexible steel, said band being entrained about a drive roll 13 and a driven roll 15 so as to be maintained taut in the region between rolls 13 and 15. Although not shown for purposes of simplicity, the drive roll 13 is mounted to rotate with a shaft 13a which is coupled to the output shaft of the drive motor (not shown). Driven roll 15 is free-wheelingly mounted upon shaft 15a. Run 11a of band 11 moves in the direction shown by arrow 17 so as to move in a plane which is parallel to a tangent of rotatable cylinder 19 mounted upon shaft 21. Shaft 21, although not shown for purposes of simplicity, is coupled to the output shaft of a second drive source for rotating drum 19 in the direction shown by arrow 23 at a high rpm.

Drum 19 is preferably of the type employed in a xerographic system in which cylindrical surface 19a of drum 19 may be formed or otherwise coated with selenium. The xerographic printing technique is well known and will not be described herein in detail. It is sufficient for the purposes of the present invention to understand that the selenium surface 19a, after transferring a latent image to a paper document, to be described in detail hereinbelow, will have the toner material remaining on its surface removed from surface 19a at 25. The non-uniform charge pattern distributed upon the surface 19a of selenium drum 19 is discharged to a pre-determined level by discharge means 27. Charging means 29 thereafter recharges the surface 19a to a pre-determined uniform level. Light emitted in a manner to be described in detail hereinbelow by means cooperating with band 11, alters the uniform charge distribution pattern in a known manner. Thereafter, a toner dispenser 31 dispenses toner upon surface 19a, with the amount of toner deposited on surface 19a being a function of the magnitude of the charge pattern at each location on the surface of the drum. Excess toner is returned to the toner dispensing means 31 in a conventional manner.

The toner deposited upon surface 19a is transferred to an elongated paper web 33 in contact with the toner deposited on surface 19a by a transfer means 35. The toner is fixed upon the paper web by a toner fixing apparatus 37 which may fix the toner on the paper web 33 by conventional techniques such as, for example, heat and/or pressure. The web 33 carrying the graphic and/or alphanumeric data may then be rolled upon a take-up spool (not shown) or cut into sheets by conventional cutting means (not shown) or folded up in the event that fanfold paper is employed.

An assembly 39 positioned in the region between band 11 and rolls 13 and 15 and incorporating an array of light generating devices capable of being switched on and off at high operating speeds is utilized, in conjunction with apertures such as, for example, apertures 11b and 11c in band 11, for the purpose of altering the charge pattern on the surface 19a of selenium drum 19 to form the desired graphic and/or character patterns.

As is well known, the charge pattern upon the surface of a selenium drum may be altered by exposing the charge pattern to radiation, the altered charge pattern representing the latent image.

Figure 2:
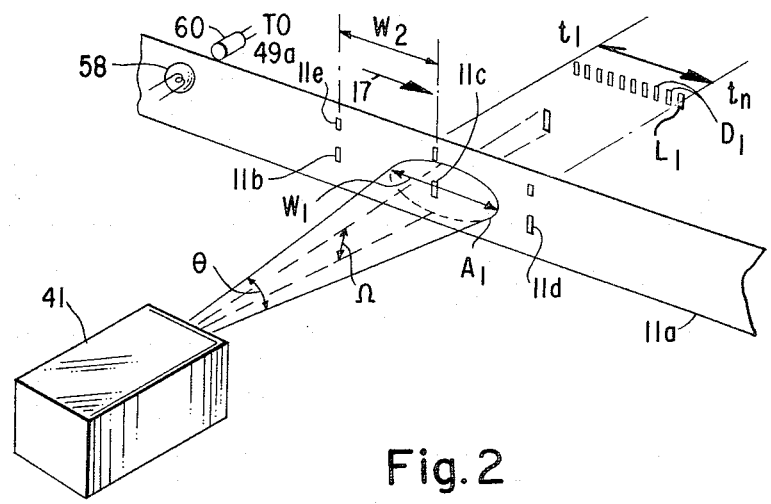
FIG. 2 shows a perspective view of a radiation source and a portion of the band of FIG. 1a and which is useful for explaining the manner in which data is formed upon the sensitized surface.
Figure 2A:
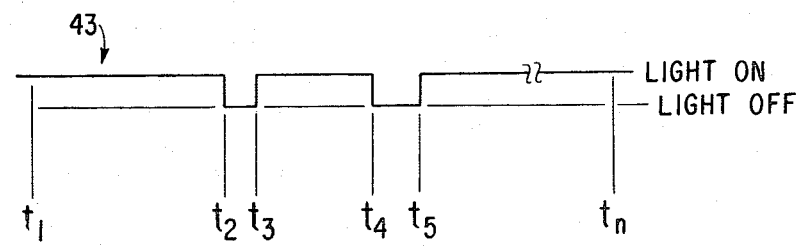
FIG. 2a shows a waveform diagram which, together with FIG. 2, is useful in explaining the manner in which the printer is operated, to print individual elements of data.
Figure 2B:
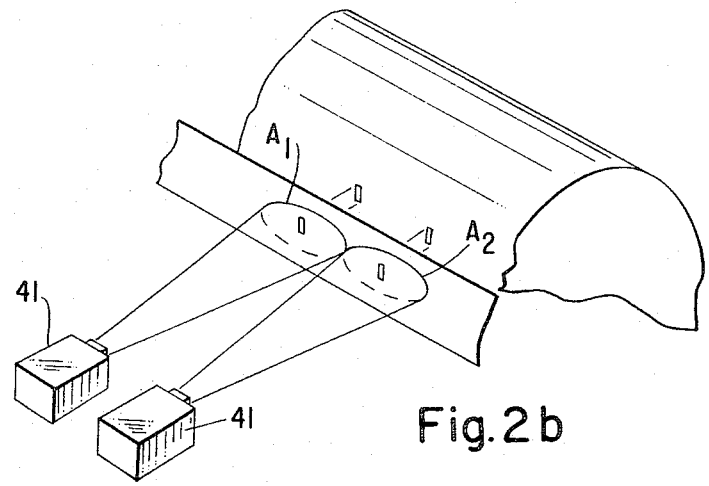
FIG. 2b is a perspective view showing the manner in which a pair of radiation sources are co-arranged to collectively illuminate adjacent areas upon the scanned surface.

The assembly 39 is comprised of an array of a plurality of light radiating sources 41, one such source 41 being shown in FIG. 2. FIG. 2b shows the manner in which two of the sources 41 are arranged in side-by-side fashion. Each radiation source 41, in a preferred embodiment, is capable of generating a light beam and each such device 41 preferably comprises a laser diode capable of generating laser radiation emitted in a substantially three-dimensional elliptical cone-shaped radiation distribution pattern having a horizontal angle theta ($\theta$) and a vertical angle omega ($\Omega$) wherein theta ($\theta$) is greater than omega ($\Omega$), i.e. $\theta > \Omega$. The width W1 of the elliptical shaped two-dimensional irradiated area A1 is equal to and preferably slightly greater than the width W2 between the openings 11b and 11c in run 11a of band 11.

Assuming opening 11c is the only opening in band 11 and the band 11 is moving in a direction shown by arrow 17 so that opening 11c traverses the region from the left-hand end of irradiated region A1 to the right-hand end thereof, if the radiation source 41 is constantly illuminated during the time taken for opening 11c to traverse the aforementioned path, an elongated line having a thickness equal to the height of opening 11c will be formed upon the scanned surface (peripheral surface 19a), said time interval being equal to $t_n-t_1$. If laser source 41 is operated at high switching speeds so that the on time interval is substantially equal to the off time interval, a line L1 of dots D1 will be formed wherein the spacing between dots D1 is equal to the width of each dot D1. Obviously, by making the on interval longer than the off interval, when switching the laser diode 41, larger dots with smaller inter-dot spacing can be formed. Conversely, by making the on interval shorter and the off interval longer, smaller dots with greater inter-dot spacing can be produced. As a further alternative, the laser device 41 may be turned off over the entire time interval during which opening 11c traverses the irradiated region A1; may be turned on over only one interval to form a single short line, a single large dot or a single small dot in any desired position along the path represented by dotted line W1. Alternatively, the switching of diode 41 may be controlled to form a plurality of dots on line W1 of any desired dot size and inter-dot spacing. By judicious selection of the number of dots formed and the positions of said formed dots, an infinite variety of graphic and/or character patterns may be produced. One typical example is the conventional dot matrix character in which the dots which are formed as opening 11c traverses path W1 and diode 41 is switched off and on, may comprise the top dot row of a line containing one or more dot matrix characters. By printing up to five dots per character along imaginary line W1 and advancing surface 19a of selenium drum 19 seven times to form seven dot rows, the system 10 is capable of producing a five column by seven row (5×8) dot matrix character. As was described hereinabove, each dot row may either be comprised of dots spaced by a small predetermined inter-dot distance, which dots are immediately adjacent to one another or alternatively may comprise continuous lines, since it is not necessary to switch the laser diode device off in the event that one horizontal "slice" of a character may preferably be represented by a continuous line formed along any given dot row. For example, noting FIG. 2a, waveform 43 represents a control signal which may be applied to the radiation source 41 for selectively controlling its illumination. A high level signal is applied to turn the laser diode 41 on while a low level signal is applied to switch the laser diode 41 to the off condition as shown. The laser diode 41 is on during the time intervals from $t_1$ to $t_2$; $t_3$ to $t_4$; and $t_5$ to $t_n$; and is off during the time interval from $t_2$ to $t_3$ and $t_4$ to $t_5$. Obviously any other pattern may be developed by appropriate selection of the switching control signal.

Figure 2C:
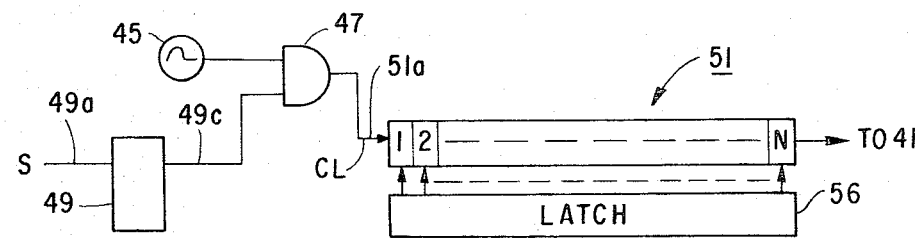
FIG. 2c shows a circuit arrangement which may be utilized to control the pulsing of a light source to print a pre-determined pattern of dots.

FIG. 2b shows an arrangement of two laser diodes 41 being positioned in side-by-side fashion. The irradiated regions $A_1$ and $A_2$ are substantially identical in overall area and shape and slightly overlap in order to cover the entire width of a dot row to be formed upon the surface 19a of drum 19. The laser diode devices 41 are arranged within assembly 39 (FIG. I) which may, for example, comprise a top 39a and parallel aligned bottom 39b (not shown for purposes of simplicity) forming an enclosure divided into compartments by opaque interior barrier walls 39c shown in dotted fashion, for example, in FIG. 4. FIG. 2c shows one circuit arrangement which may be utilized to control the laser diode 41 to print a predetermined pattern of dots. As shown in FIG. 2c, a clock source 45 is coupled to one input of AND gate 47. The other input of AND gate 47 is coupled to the output of a bistable flip-flop 49 having Set and Reset inputs 49a and 49b, respectively. The output of AND gate 47 is coupled to the clock input 51a of a multi-stage shift register 51. The output stage of shift register 51 is coupled to the control input of an associated one of the laser diodes 41. A latch circuit 56 having a plurality of stages equal in number to the stages in shift register 51 is provided to load binary data into all of the stages of shift register 51 in parallel fashion. Each stage of shift register 51 is adapted to store a binary bit which in a first binary state represents a turn on condition and when in the opposite binary state represents a turn off condition.

A timing marker in the form of an opening 11e shown for example in FIG. 2 and which may be provided with only one of the openings such as opening 11b or may be provided with each of the openings, for example openings 11b through 11d, is adapted to cooperate with a light source 58 and light sensing element 60 positioned on opposite sides of band 11 to couple a start pulse to Set input comprising input 49a of bistable flip-flop 49. The output 49c of bistable flip-flop goes high to enable AND gate 47 to pass pulses from clock pulse source 45 to the clock input 51a of shift register 51 which comprises N stages for generating up to N control pulses. The outputs of all the stages are shifted to the right by the clock pulses from source 45 to be applied to the control input of the associate laser diode source 41 when each data bit reaches output stage N.

Binary data is inputted to shift register 51 through latch means 56 enabling all of the binary data to be shifted into N stage register 51 in parallel. When gate 47 is enabled, clock pulse source 45 applies clock pulses to clock pulse input 51a shifting data in the N stages of shift register 51 to the right. The output stage of shaft register 51 is coupled to the control input of its associated laser diode 41 wherein each binary one level signal, for example, is utilized to turn the associated laser diode 41 on while binary zero level signals cause the associated laser diode 41 source to be switched off. One-shot multivibrator, 49 which is triggered by sensor 60, is adapted to reset automatically after a predetermined time interval has elapsed, which time interval is sufficient for shifting all of the data stored in the N stage shift register 51 out of the shift register. The above operation is then repeated for each subsequent line of data to be printed. Although only once control circuit has been described, it should be understood that a similar control circuit is provided for each of the laser diodes 41 in the array 39.

As will be appreciated, the band 11 is moved at extremely high speeds and although designed to the closest practical manufacturing tolerances, band 11 can be expected to experience some movement in a direction transverse to the movement of band 11 shown by arrow 17, said movement causing perturbations in the placement of the beams being represented by displacements in the directions shown by arrows 63 and 65 shown in FIG. 3. In order to eliminate the creation of a dot at a position displaced from the desired position, which results in a misregistration of the dot, the embodiment of FIG. 3 comprises a band 11 having an elongated slot 11f. This elongated slot 11f is designed to cooperate with a stationary mask 68 provided with a narrow elongated slot 70 which limits the passage of a light beam from laser diode source 41 in the horizontal direction. FIG. 3a shows examples of possible alignments which may occur due to perturbations in the movement of band 11 causing the band 11 to experience some undesirable transverse movement either in the upward or downward direction. Assuming that band 11 moves in the direction shown by arrow 17 and experiences no perturbations, the opening 11f in band 11 will occupy the position 11f'' as shown in FIG. 3a. The alignment of opening 11f together with the opening 70 at mask 68 will pass light only in the coinciding open regions to pass light to irradiate a rectangular-shaped area represented by $D_1$. In the event that band 11 experiences a slight perturbation causing a slight upward vertical movement, the opening 11f in band 11 will occupy the position shown at 11f. Again it can be seen that the opening 11f in band 11 cooperates with the opening 70 in mask 68 to form a dot of the identical configuration. A slight perturbation in the downward vertical direction will cause the opening 11f in band 11 to occupy the position 11f' shown in FIG. 3a while a more severe perturbation in the downward vertical direction will cause the opening to occupy the position 11f'. Regardless of the extent of the perturbation (within practical limits) it can nevertheless be seen that the opening 70 in mask 68 cooperates with the elongated opening 11f provided in band 11 to assure the creation of a dot of the proper size and position, thus providing a simple and yet highly effective arrangement for any misregistration due to the aforesaid perturbations.

It should be noted from a consideration of the embodiment shown in FIGS. 1a and 1b that selenium drum 19 is constantly rotated during the printing operation. As a result, the drum surface 19a moves upwardly as shown by arrow 23 in FIG. 1b through a small increment during the time it takes opening 11a in band 11 to move across the distance W1 as drum surface 19a passes array 39 so that each dot which has been formed upon the surface 19a of the selenium drum moves upwardly very slightly relative to the next dot to be formed. Thus an array of dots will be aligned along an imaginary line which slopes downwardly and toward the right relative to FIG. 1a for example. To compensate for this misregistration effect, mask 68 is provided with a plurality of elongated slots 70' each arranged to slope upwardly and toward the right and cooperating with the elongated slots 11f, 11g and 11h in band 11 to form at the intersection thereof dots of constant, uniform size, as per the explanation of FIG. 3a, while at the same time correcting for the effect of the upward movement of drum 19 relative to the movement of band 11 so that the resulting dots lie along an imaginary line which is parallel to the central axis of drum 19.

Figure 5:
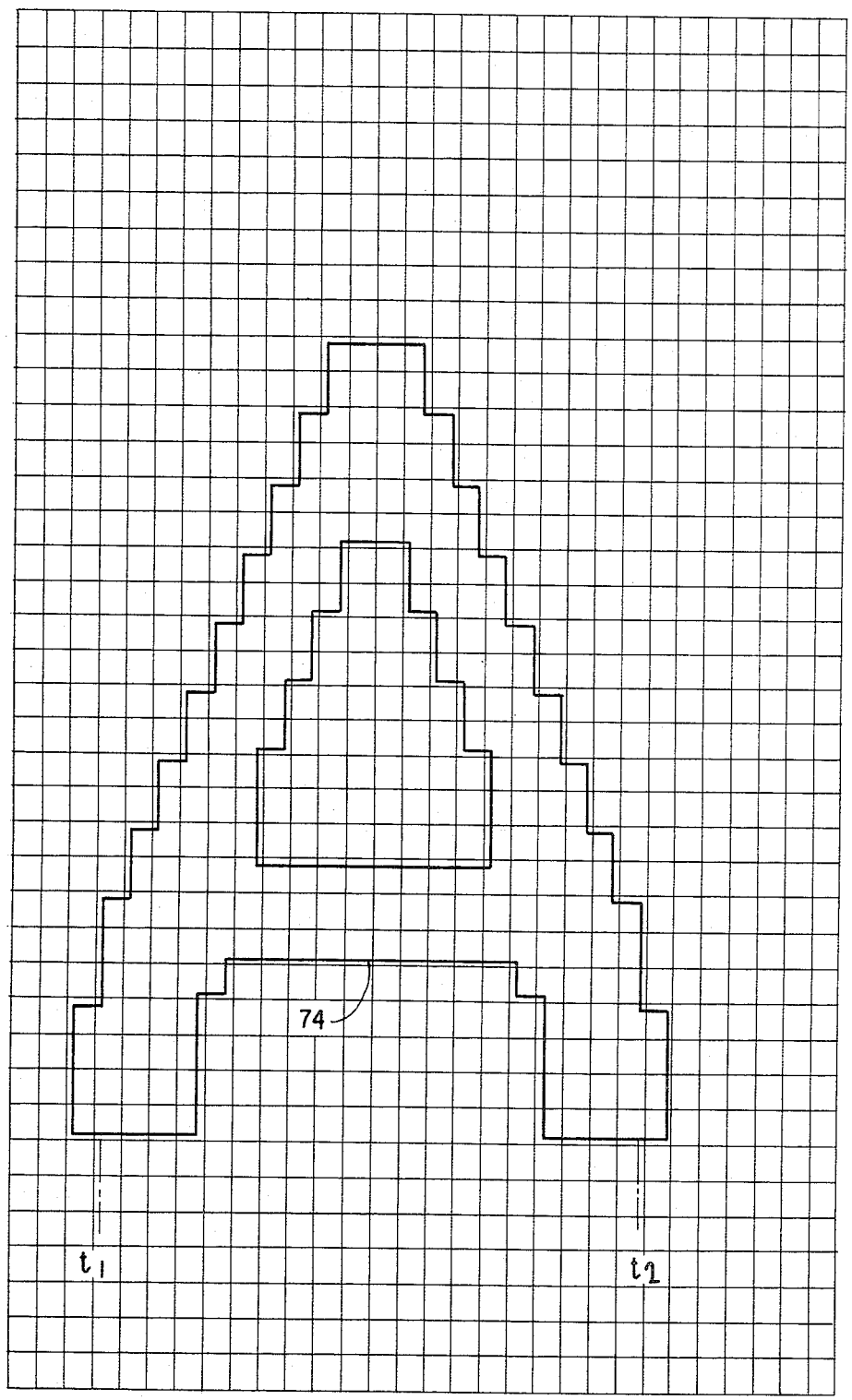
FIG. 5 shows a typical character which may be printed when utilizing the system of the present invention and which is useful in describing alternative arrangements of the technique.

Although the openings 11f, 11g, 11h in band 11 are shown as being square-shaped when no mask is employed or of an elongated rectangular shape when a mask 68 is employed, it should be understood that the openings may assume other shapes such as circular, elliptical, diamond shape, x-shaped, and so forth, dependent only upon the needs of the user. FIG. 5 shows a typical alphabetic character and specifically the character "A" which may be formed by the apparatus of the present invention and specifically through the use of a band employing a substantially square-shaped opening or alternatively a rectangular opening, when used in conjunction with mask 68. It should be understood that the character "A" shown in FIG. 5 has been enlarged by a significant amount in order to simplify the explanation of the manner in which a character is formed. The character "A" is formed within a rectangular region having a height of 1/6" and a width of 1/10" and is generated by advancing band 11 across the adjacent surface of drum 19 twenty-three (23) times. Each rectangular shaped dot occupies an area of the order of 0.0033 inches by 0.004 inches. When forming the cross bar portion 74 of the character "A" the beam is maintained on continuously from a time $t_1$ to $t_2$ thus providing a continuous cross bar. The timing is controlled so that the marginal areas of each dot overlap marginal portions of adjacent dots forming a solid character having no inter-dot spacings or gaps whatsoever yielding a character of high resolution, good quality and which is easily discernible lending itself advantageously for use in optical character recognition devices.

FIG. 6 shows still another embodiment 80 of the present invention, in which an array of individual optical fiber elements 81-1 through 81-N are arranged behind band 11. By controlling the illumination of laser diode source 41, light is caused to pass through opening 11k so as to be picked up by the acceptor end 81a of the associated fiber optic element 81-1 through 81-N. The fiber optic elements may be shaped at their output ends to form different characters or symbols such as the letter "A" provided at the output end 81-b of fiber optic element 81-1 or the letter "B" provided at the output end 81-b of the fiber optic element 81-4. The fiber optic elements may also be positioned adjacent to openings provided in a mask 86 which opening may be formed to define the letter "C", for example. The outputs of the fiber optic elements 81-1 through 81-N may be utilized in xerographic printers or for other applications.

A latitude of modification, change and substitution is intended in the foregoing disclosure and, in some instances, some features of the invention will be employed without a corresponding use of other features. Accordingly, it is appropriate that the appended claims be construed broadly and in a manner consistent with the spirit and scope of the invention herein. For example, the selenium drum 19 may be replaced by an elongated moving web of sensitized paper which is exposed to the laser radiation to create the graphic and/or alphanumeric information to be printed thereon.

What is claimed is:

1. A high speed non-impact printer comprising:
an array of independent radiation sources and switching means for selectively switching said radiation sources on and off at high speed, said radiation sources emitting radiation in a first direction;
a scanned surface movable at a high speed past said array;
a band interposed between said array of radiation sources and said scanned surface and means for moving said band at high speed and in a direction transverse to the direction of movement of said scanned surface, said band having at least one opening moving across said scanned surface for passing radiation from at least one of said radiation sources to said scanned surface as said one radiation source is selectively energized;
said band being positioned relative to said scanned surface to eliminate the need for focussing optics between said band and said scanned surface; and
radiation sensitive means on said scanned surface responsive to said radiation for use in creating an image, the cooperation between said radiation sources and said radiation sensitive means providing said non-impact capability.

2. The apparatus of claim 1 wherein said scanned surface comprises a rotating cylindrical drum; and
said radiation sensitive means comprising means on said drum sensitive to said radiation for creating a latent image.

3. The apparatus of claim 2 wherein said image creating means comprises a light sensitive emulsion.

4. The apparatus of claim 2 wherein said radiation sensitive means comprises a cylindrical surface on said drum formed of a material adapted to develop a substantially uniform electrical charge pattern, which charge pattern is altered by the exposure to radiation passing through the opening in said band.

5. The apparatus of claim 1 wherein said scanned surface is an elongated web; and
said radiation sensitive means comprises means on said web sensitive to said radiation to create a latent image on the surface of said web responsive to the presence of said radiation.

6. The apparatus of claim 1 wherein each of said radiation sources comprises a light generating means of a type capable of being switched on and off at very high switching speeds by said switching means.

7. The apparatus of claim 6 wherein said switching speeds are in the time interval of the order of nanoseconds.

8. The apparatus of claim 6 wherein said light generating means comprises a laser diode.

9. The apparatus of claim 1 wherein each of said radiation sources is a laser diode.

10. The apparatus of claim 1 wherein said band comprises a closed-loop band.

11. The apparatus of claim 10 wherein said band is provided with a plurality of openings each being associated with one of said radiation sources.

12. The apparatus of claim 10 wherein said switching means includes electronic control means responsive to input data for selectively switching said radiation sources on and off at high speed and in a predetermined sequence to develop a pattern on said scanned surface comprised of data to be printed on said scanned surface.

13. The apparatus of claim 1 wherein said openings have a predetermined elongated narrow configuration; and
mask means positioned between said array and said scanned surface and cooperating with the opening in said band to prevent the radiation passing through said opening to be displaced in a direction transverse to the direction of movement of the opening in said band so as to provide accurate registration of printed material upon said scanned surface.

14. The apparatus of claim 1 wherein the opening in said band is a narrow elongated opening; and
mask means comprising at least one narrow elongated opening sloping at a predetermined angle, the elongated opening in said mask cooperating with the elongated opening in said band to compensate for movement of said scanned surface transverse to movement of said band during the time that the opening in said band is moving in order to assure the printing of a line of information of uniform thickness and which line is substantially parallel to the path of movement of said band.

15. The apparatus of claim 1 further comprising electronic control means for selectively switching each of said light sources on and off at electronic speeds, said control means comprising register means for receiving binary data representative of the desired switching state of the light source; and
said register means including means for applying to said radiation sources a switching signal whose signal level is determined by the state of the binary data in said register means which is operated at a rate commensurate with the movement of said band across said scanned surface.

16. The apparatus of claim 15 wherein said array further comprises housing means for housing all of said radiation sources; and
compartment means for separating said radiation sources from one another, the barriers between adjacent compartments comprising means for preventing radiation from passing therethrough.

17. The apparatus of claim 1 further comprising fiber optic elements positioned between said band and said scanned surface for directing radiation picked up by said fiber optic element to a predetermined output location.

18. The apparatus of claim 1 wherein said band is a closed-loop band;
first driven roller means;
second free-wheeling roller means;
said closed-loop band being entrained about said roller means and having a first run thereof extending between said first and second roller means and arranged in closely spaced parallel fashion relative to said scanned surface;
said array being positioned in the region surrounded by said band, the outputs of said light generating means each being arranged in close proximity to said first run of said band.

19. The apparatus of claim 1 wherein said radiation sources are each comprised of a laser diode, each of said laser diodes emitting laser light, the rays of said laser light forming a beam having a substantially pyramidal shape wherein a first pair of opposing sides of said pyramid-shaped region form a first angle and wherein the remaining opposing sides of said pyramid-shaped region form a second angle, one of said angles being substantially greater than the remaining one of said angles whereby the area irradiated by said laser diode element has a substantially elongated rectangular shape.

20. The apparatus of claim 1 wherein the scanned surface comprises a cylindrical surface of a rotating cylindrical member;
said cylindrical surface including means for receiving and indefinitely storing an electrical charge;
means positioned adjacent to said cylindrical surface for developing a uniform electrical charge on said surface;
means for depositing toner means upon said cylindrical surface on the portion of the cylindrical surface which has been exposed to illumination by said light means and said band; and
means for transferring toner deposited upon said cylindrical surface to a paper web.

21. The apparatus of claim 20 further comprising means for permanently fixing said toner to said web.

22. The apparatus of claim 21 further comprising means for removing toner remaining on said cylindrical surface after it has been transferred to said web; and
means for discharging the electrical charge pattern on said cylindrical surface.

* * * * *

UNITED STATES PATENT AND TRADEMARK OFFICE
CERTIFICATE OF CORRECTION

PATENT NO. : 4,357,619
DATED : November 2, 1983
INVENTOR(S) : Klockenbrink

It is certified that error appears in the above—identified patent and that said Letters Patent is hereby corrected as shown below:

Column 5, line 38, "(5 x 8)" should be changed to --(5 x 7)--.

Column 6, line 39, change "shaft" to --shift--.

Column 7:

Line 17, change "11f" to --11f'--;

Line 24, change " 11f' " to --11f'''--.

Signed and Sealed this

Second Day of August 1983

[SEAL]

Attest:

GERALD J. MOSSINGHOFF

Attesting Officer

Commissioner of Patents and Trademarks